United States Patent Office 3,641,013
Patented Feb. 8, 1972

3,641,013
17β-HYDROXY-18-METHYL-4-ESTRENE-3-ONE
AND DERIVATIVES THEREOF
Otto Engelfried, Friedmund Neumann, and Rudolf Wiechert, Berlin, Germany, assignors to Schering Aktiengesellschaft, Berlin and Bergkamen, Germany
No Drawing. Filed Sept. 9, 1968, Ser. No. 759,535
Int. Cl. C07c 169/22
U.S. Cl. 424—243     9 Claims

ABSTRACT OF THE DISCLOSURE

Racemic and optically active 17β-hydroxy-18-methyl-4-estrene-3-one derivatives characterized by anabolic activity having the formula:

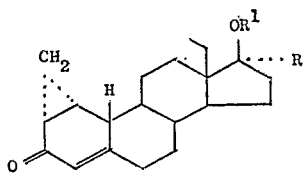

wherein R is hydrogen or saturated or unsaturated hydrocarbyl and $R^1$ is hydrogen or acyl.

The process of preparing the above compounds comprises introducing into the 4,5-position of the saturated A-ring of the 1α,2α-methylene-3-ketosteroid a double bond and thereafter if desired the free 17-hydroxy group in the resulting product is acylated or saponified to a 17-acyloxy group.

---

This invention relates to racemic and optically active 17β-hydroxy-18-methyl-1α,2α-methylene - 4 - estrene-3-one derivatives and to processes for preparing such compounds.

More particularly, this invention relates to compounds having the following formula:

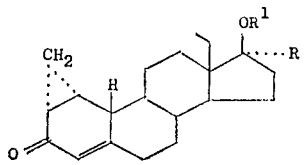

wherein R is hydrogen or saturated or unsaturated hydrocarbyl and $R^1$ is hydrogen or acyl.

The compounds of the invention are prepared by introducing a double bond into the 4,5-position of the A-ring of a saturated 1α,2α-methylene-3-ketosteroid in the conventional manner and thereafter if desired acylating the free 17-hydroxy group present in the product or alternatively saponifying the acylated 17-hydroxy group.

As acyl groups there are to be considered, those which are derived from acids which in steroid chemistry are conventionally used for esterification. Preferably, there are involved the acyl groups derived from aliphatic carboxylic acids containing from 1 to 12 carbon atoms. It is to be understood that these acids, can be saturated, branched, multibasic or substituted by hydroxyl, amino or halogen. There are also suitable cycloaliphatic, aromatic mixed aromatic-aliphatic or heterocyclic acids which can be unsubstituted or substituted as just set out. Illustrative of the acids suitable for forming the acyl group $R^1$ are the following: acetic acid, propionic acid, onanthic acid, capronic acid, undecylic acid, trimethylacetic acid, haloacetic acid, cyclopentylpropionic acid, phenylacetic acid, phenoxyacetic acid, dialkylaminoacetic acid, piperidinoacetic acid, benzoic acid, succinic acid and the like.

The saturated or unsaturated hydrocarbyl group R can be for example methyl, ethyl, vinyl, ethinyl etc.

The double bond can be introduced into the 4,5-position of the starting steroid by any of the known methods used in steroid chemistry for this purpose. An expedient method for the introduction of the $\Delta^4$-double bond is via the 4-halogenosteroid, which compound can be obtained for example by brominating the 3-enolester followed by splitting off of hydrogen halide. The dehydrogenation can also preferably be carried out by means of a dehydrogenation agent as for example selenium dioxide or a quinone for example 2,3-dichlor-5,6-dicyanobenzoquinone.

The product containing a free 17-hydroxy group can thereafter be esterified or saponified by the known methods.

The novel compounds of the invention are useful in the preparation of medicinal agents. The compounds are useful because of their anabolic activity. Compared to the known anabolic agents, the compounds of the invention have a more marked (higher degree of) activity and are furthermore distinguished by a favorable dissociation of the desired anabolic effect from the undesired androgenic effect. Still further, the compounds of the invention where R is H, in spite of a missing 17-alkyl group, evidence this favorable anabolic activity following oral administration.

The following table is given to demonstrate the high anabolic activity of the optically active 17-acetoxy-18-methyl-1α,2α-methylene-4-estren-3-ones (I) as they are obtained according to the present invention whereby the anabolic activity of two of the most widely used and effective anabolic agents, namely testosteronepropionate (II), the latter also constituting the standard substance and 4-chlortestosterone acetate, is given in comparison.

The data reported in the table were obtained from castrated male rats following subcutaneous administration of the test compounds and based on the conventional Levator ani/Seminal vesicle test. As comparison value there is reported the smallest dose which resulted in a Levator ani weight of at least 40 mg. per 100 g. rat (anabolic activity); in addition the corresponding seminal vesicle weight per 100 g. rat (androgenic activity) is also included.

TABLE

| Number | Test compound | Dose, in mg. | Lev. ani., weight in mg. | Seminal vesicle, in mg. |
|---|---|---|---|---|
| I | 17β-acetoxy-18-methyl-1α,2α-methylene-4-estrene-3-one. | 0.1 | 44 | 80 |
| II | Testosterone propionate | 0.3 | 44 | 380 |
| III | 4-chlor-testosterone acetate | 3.0 | 40 | 113 |

It is evident from the table that the standard substance II and the known anabolic agent III do not possess the same degree, i.e., unexpected increase, in anabolic effectiveness and furthermore the compound of the invention possesses an unexpectedly favorable therapeutic ratio, i.e. anabolic/androgenic activity, as compared to both comparison substances II and III.

The anabolic steroids of the invention can be administered orally, for instance in the form of tablets, pills and the like. The new compounds can also be administered parenterally, for instance by subcutaneous or intramuscular injection. The compounds within the scope of the invention which contain an ester group derived from a higher fatty acid are, because of their delayed or protracted activity, eminently suited for use in the formulation of depot preparations.

The following is given as illustrative of the methods of preparing therapeutic compositions containing the compounds of the invention as active ingredient.

(A) Tablets containing 5 mg. 17β-acetoxy-18-methyl-1α, 2α-methylene-4-estrene-3-one Composition of each tablet:

|  | Mg. |
|---|---|
| 17β-acetoxy-18-methyl-1α,2α-methylene - 4 - estrene-3-one (finely micronized) | 5 |
| Lactose (DAB 6) | 105 |
| Corn starch (USP XVI) | 8 |
| Magnesium stearate (USP XVI) | 1 |
| Talc (DAB 6) | 1 |
|  | 120 |

Tablets were prepared from large quantities of the above in the conventional manner using the readily available tablet pressing equipment.

Diameter: 7 mm. grooved
Height: 2.7–2.8 mm.
Hardness: 4–5 kg.
Dissociation time—gastric juice at 37° C.: 15 sec.

(B) Capsules containing 1 mg. 17β-acetoxy-18-methyl-1α,2α-methylene-4-estrene-3-one Composition of each capsule:

|  | Mg. |
|---|---|
| 17β-acetoxy-18-methyl-1α,2α-methylene-4 - estrene-3-one (finely micronized) | 1.00 |
| Lactose (DAB 6) | 66.50 |
|  | 67.50 |

The composition was filled into hard gelatin capsules.

(C) Oily solutions in ampules for intramuscular injection (1) 1 ml. contains 20 mg. 17β-acetoxy-18-methyl-1α, 2α-methylene-4-estrene-3-one were dissolved in sesame oil, made up to 100 ml., the resulting solution introduced in 1 ml. amounts in to ampules, the ampules sealed and sterilized by heating for 1 hour at 120° C.

(2) 1 ml. contains 50 mg. 17β-acetoxy-18-methyl-1α, 2α-methylene-4-estrene-3-one in ricin oil/benzylbenzoate (6.4), made up to 100 ml., the solution filled into ampules in 1 ml. amounts and sterilized in the known manner.

The compounds of the invention have proved to be of great therapeutic value for their anabolic effect and may be used to advantage in the treatment of those conditions where there is a requirement to promote the build-up of protein. Such conditions include convalescence, general debilitation, consuming illnesses, cachetic conditions, X-ray and cytostatic therapy, particularly as used in the treatment, anemia, prolonged treatment with corticoid preparations, osteoporosis, chronic liver and kidney conditions, hyperthyroidism, muscular, dystrophy, growth disturbances particularly in children, etc.

The doses to be administered vary according to the severity of the condition being treated. Ordinarily, 2 to 25 mg. of compound per day have proved to be especially useful.

The following examples serve to illustrate the present invention without, however, limiting the same thereto. Examples 1 and 2 illustrate preparation of the starting materials used.

EXAMPLE 1

Rac. 17β-acetoxy-18-methyl-1α,2α-methylene-5α-estran-3-one (1) RAC. 17β-ACETOXY-18-METHYL-5α-ESTRAN-3-ONE 15 g. rac. 17β - hydroxy - 18-methyl-4-estrene-3-one (Experentia 19/63/394) were dissolved in 300 ml. tetrahydrofuran and the resultant solution introduced, under stirring into a vessel containing 1.5 g. lithium in liquid ammonia. After 1–2 hours 50 g. ammonium chloride were added, portionwise and the reaction mixture allowed to stand overnight at room temperature. The reaction mixture was then extracted with methylene-chloride, and the methylene chloride solution washed till neutral and dried. Following chromatographing on silica gel, there were recovered 7.6 g. rac. 17β-hydroxy-18-methyl-5α-estran-3-one having a melting point of 136.5–137° C. (acetic ester), the yield could be increased 10–15% if in the reduction the by-product rac. 18–methyl-5α-estran-3β,17β-diol having a melting point of 184–185° C. (acetic ester) is also recovered so that following the chromatographing there is recovered a mixture of diol and oxyketone which can be oxidized with chromic acid to rac. 18 - methyl-5α-estran-3,17-dione having a melting point of 138–139.5° C. (acetic ester/hexane). The latter following treatment with methanol in the presence of p-toluene sulfonic acid is converted into rac. 3,3 - dimethoxy - 18-methyl-5α-estran - 17 - one (fusion point 156–157° C.—methanol) which after reduction and ketal splitting is converted into 17β-hydroxy-18-methyl-5α-estran-3-one.

Following treatment with acetic hydride in pyridine under mild heating, there was recovered in about a 90% yield rac. 17β-acetoxy-18-methyl-5α-estran-3-one having a fusion point of 150–151.5° C. (acetic ester).

(2) RAC. 17β-ACETOXY-18-METHYL-5α-ESTR-1-ENE-3-ONE 15.9 g. rac. 17β - acetoxy - 18-methyl-5α-estran-3-one were reacted with 17.2 g. dibrompyridine-hydrobromide in 160 ml glacial acetic acid for 30 minutes at 60° C. The brominated reaction product was heated for 3 hours at 125° C. with 235 ml. dimethylformamide, 78 g. calcium carbonate and 40 g. lithium bromide and was thereby dehydrobrominated. Following chromatographing on silica gel there were recovered 40% rac. 17β - acetoxy-18 - methyl - 5α - estr - 1-ene-3-one having a fusion point of 161–162° C. (isopropyl ether).

(3) METHYLENEATION 4.33 g. rac. 17β - acetoxy - 18 - methyl-5α-estr-1-ene-3-one in 100 ml. dimethyl sulfoxide were reacted with 3.46 g. trimethylsulfoxoniumiodide and 0.35 g. sodium hydride for 5-6 hours at room temperature. After chromatographing the reaction mixture on silica gel, there were obtained 40% rac. 17β - acetoxy - 18-methyl-1α,2α-methylene-5α-estran-3-one having a fusion point of 142–143° C. (isopropyl ether).

EXAMPLE 2

17β-acetoxy-18-methyl-1α,2α-methylene-5α-estran-3-one

The following intermediate products were prepared under similar reaction conditions as the corresponding racemate set out above:

(1) 17β-ACETOXY-18-METHYL-5α-ESTRAN-3-ONE

Through reduction of 15 g. 17β - hydroxy - 18-methyl-4-estrene-3-one (Chem. Soc. 1964, 4472) with lithium in liquid ammonia there were obtained 53% 17β-hydroxy-18-methyl-5α-estran-3-one. The yield could be increased by 10% by oxidation of the by-product 18-methyl-5α-estran - 3β,17β - diols (melting point 142° C., acetic ester) to 18 - methyl - 5 - estran-3,17-dione (melting point 149–150° C., methylenechloride/hexane)—3,3 - dimethoxy - 18 - methyl-estran-17-one (melting point 170–171.5° C., methanol)—17β-hydroxy-18 - methyl - 5α-estran-3-one. The acetylation was carried out with acetic anhydride in pyridine under slight application of heat. There were recovered in quantitative yield 17β-acetoxy-18-methyl-5α-estran-3-one (viscous oil, melting point 144–145° C.).

(2) 17β-ACETOXY-18-METHYL-5α-ESTR-1-ENE-3-ONE

From 15 g. 17β - acetoxy - 18 - methyl-5α-estran-3-one there were obtained through bromination and dehydrobromination, followed by chromatographing on silica gel, 35% 17β - acetoxy - 18 - methyl-5α-estr-1-ene-3-one having a melting point of 120.5–122° C. (hexane).

(3) METHYLENEATION

32% 17β - acetoxy - 18 - methyl-1α,2α-methylene-5α-estran-3-one having a melting point of 149.5–150° C. (hexane) were recovered by reaction of 4.0 g. 17β-acetoxy-18-methyl-5α-estr-1-ene-3-one with trimethylsulfoxonium iodide and sodium hydride in dimethylsulfoxide.

(4) 17β-HYDROXY-18-METHYL-1α,2α-METHYLENE-5α-ESTRAN-3-ONE 3 g. of the acetate (see (3) above) were warmed with aqueous-methanolic $K_2CO_3$ solution and yielded 2.5 g. 17β - hydroxy - 18 - methyl-1α,2α-methylene-5α-estran-3-one having a melting point of 216–218° C. (acetic ester).

(5) 17β-PROPIONYLOXY-18-METHYL-1α,2α-METHYLENE-5α-ESTRAN-3-ONE 2 g. of the 17-hydroxy compound described under (4) above were reacted with propionic acid anhydride in pyridine (steam bath for 90 minutes) to yield 2.3 g. of the corresponding propionate having a melting point of 151–152° C. (methylenechloride/hexane).

EXAMPLE 3

5 g. rac. 17β - acetoxy - 18 - methyl-1α,2α-methylene-5α-estran-3-one in 100 ml. abs. benzene were heated at boiling in the presence of 20 ml. isopropenylacetate and 600 mg. p-toluenesulfonic acid for 4 hours. Following cooling to room temperature, the reaction mixture was diluted with acetic ester and the resultant mixture washed successively with bicarbonate solution and water. The thusly washed mixture was dried over sodium sulfate, evaporated and the residue chromatographed over silica gel. There were recovered 4.3 g. rac. 3,17β-diacetoxy-18-methyl - 1α,2α - methylene - 5α-estr-3-ene having a melting point of 121–123° C. (methylene chloride/hexane).

The bromination was carried out by dissolving 1.9 g. of enolacetate in 51 ml. tetrachlorinated hydrocarbon and then adding 0.25 mml. bromine in 5.1 ml. tetrachlorinated hydrocarbon and stirring for 5 minutes at room temperature. The mixtuure was then diluted with acetic ester and washed with bicarbonate solution and water. Following drying over sodium sulfate, the dried solution was evaporated and the residue dehydrobrominated in 63 ml. dimethylformamide in the presence of 4.2 g. calcium carbonate and 2.1 g. lithium bromide by heating under nitrogen for 3 hours. The resulting mixture was filtered using suction while still warm over a glass filter, washed with hot dimethylformamide, concentrated under decreased pressure and precipitated from ice water. The crude product was chromatographed over silica gel. There were recovered in 73% yield rac. 17β-acetoxy-18-methyl-1α,2α-methylene - 4 - estrene - 3 - one having a melting point of 135–137° C. (acetic ester); UV: $\epsilon_{241}=13.800$.

EXAMPLE 4

1.2 g. rac. 17β-propionyloxy-18-methyl-1α,2α-methylene-5α-estran-3-one having a melting point of 131.5–132.5° C. (prepared analogously to the 17β-acetate described under Example I) were converted into the 3-enolacetate-17-propionate according to the procedure of Example 3 and then brominated and dehydrobrominated as set out in that example. Following preparative thin-layer chromatography of the resulting reaction mixture, there were recovered 0.8 g. rac. 17β-propionyloxy-18-methyl-1α,2α-methylene-4-estrene-3-one having a melting point of 112–113.5° C. (hexane).

The same compound was prepared by 1 hour's treatment of 0.3 g. rac. 17β-hydroxy-18-methyl-1α,2α-methylene-4-estrene-3-one (prepared according to Example 5) with 1 ml. propionic acid anhydride and 1 ml. pyridine under heating followed by decomposition with water (melting point 113–114° C. (hexane); UV: $\epsilon_{241}=14100$.

EXAMPLE 5

A solution of 685 mg. rac. 17β-acetoxy-18-methyl-1α,2α-methylene-4-estrene-3-one in 40 ml. tetrahydrofuran was cooled down to −10 to −20° C. and then reacted with 4 ml. N/1 sodium methylate solution in methanol under stirring in an ice bath for 30 minutes. The bath temperature was then increased to 0° C. and the mixture decomposed with saturated ammonium chloride solution and extracted with ether. The washed and dried ether solution was then evaporated. Following preparative thin-layer chromatography, there were recovered in a 95% yield 17β-hydroxy-18-methyl - 1α,2α - methylene - 4-estrene-3-one having a melting point of 205–209° C.

EXAMPLE 6

2 mg. 17β-acetoxy - 18 - methyl - 1α,2α - methylene-5α-estrene-3-one were converted into the enol acetate having a melting point of 100–103° C., analogously to Example 3 and the enol acetate then brominated and dehydrobrominated as set out in that example. After preparative thin-layer chromatography there were recovered 1.2 g. 17β-acetoxy-18-methyl-1α,2α-methylene-4-estrene-3 - one having a melting point of 119–121° C. (ether-hexane).

EXAMPLE 7

1.57 g. 17β-acetoxy-18 - methyl - 1α,2α - methylene - 4-estrene-3-one in -100 ml. tetrahydrofuran were saponified according to the procedure of Example 5 with 9.2 ml. N/1 sodium methylate solution. After thin-layer chromatography, 17β-hydroxy-18-methyl - 1α,2α - methylene-4-estrene-3-one having a melting point of 235–242° C. (acetic ester) were obtained. UV: $\epsilon_{242}=13900$.

EXAMPLE 8

2.2 g. 17β-propionyloxy-18-methyl-1α,2α-methylene-5α-estrane-3-one were converted into the 3-enol acetate-17-propionate having a melting point of 111–112° C. according to the procedure of Example 4 and this product brominated and dehydrobrominated as set out in Example 3. After thin-layer chromatography there were obtained 1.5 g. 17β-propionyloxy-18-methyl - 1α,2α - methylene - 4-estrene-3-one having a melting point of 106–107° C. (ether-hexane). UV: $\epsilon_{240}=14100$.

The same compound was prepared by converting the 17-hydroxy compound described in Example 7 with propionic acid anhydride in pyridine.

EXAMPLE 9

1.3 g. 17β-hydroxy - 18 - methyl - 1α,2α - methylene - 4-estrene-3-one were taken up in a mixture of 5.2 ml. absolute benzene and 1.3 ml. pyridine and then reacted with 0.78 ml. 2'-phenyl-propionic acid chloride in 2.6 ml. absolute benzene at a temperature of 0–10° C. The reaction mixture was then stirred for 18 hours under nitrogen and at room temperature. The mixture was then precipitated from ice water, extracted with ether, the separated ether phase washed successively with dilute bicarbonate solution and water and dried over sodium sulfate. Following evaporation of the ether, the only crystalline residue was crystallized from methylene chloride-hexane. There were thusly recovered 1.5 g. 17β-(2'-phenyl-propionyloxy)-18-methyl-1α,2α-methylene-4-estrene - 3 - one having a melting point of 119–121° C.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A racemic and optically active compound corresponding to the formula:

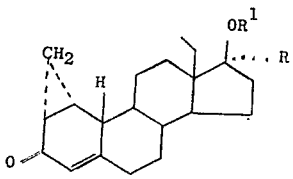

wherein R is a member selected from the group consisting of hydrogen, methyl, ethyl, vinyl and ethinyl and $R^1$ is a member selected from the group consisting of hydrogen and acyl.

2. A racemic and optically active compound according to claim 1 designated 17β-acetoxy-18-methyl-1α,2α-methylene-4-estrene-3-one.

3. A racemic and optically active compound according to claim 1 designated 17β-propionyloxy-18-methyl-1α,2α-methylene-4-estrene-3-one.

4. A racemic and optically active compound according to claim 1 designated 17β-hydroxy-18-methyl-1α,2α-methylene-4-estrene-3-one.

5. A racemic and optically active compound according to claim 1 designated 17β-(2′-phenyl-propionyloxy)-18-methyl-1α,2α-methylene-4-estrene-3-one.

6. A therapeutic composition according to claim 1 as active ingredient in admixture with a pharmaceutically acceptable carrier.

7. A therapeutic composition according to claim 6 in dosage unit form.

8. A therapeutic composition according to claim 6 containing 1 to 25 mg. of said compound per dosage unit.

9. A method of producing an anabolic effect in a debilitated subject comprising administering daily to such subject from 2 to 25 mg. of a compound according to claim 1.

References Cited
UNITED STATES PATENTS

| | | | |
|---|---|---|---|
| 3,242,050 | 3/1966 | Wiechert | 167—74 |
| 3,365,445 | 1/1968 | Wiechert et al. | 260—239.55 |

ELBERT L. ROBERTS, Primary Examiner

U.S. Cl. X.R.

260—397.4, 397.3, 397.5